Figure 1:
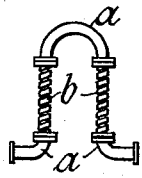

No. 700,378. Patented May 20, 1902.
K. SCHMIDT.
PIPE COMPENSATOR.
(Application filed Feb. 12, 1901.)
(No Model.) 4 Sheets—Sheet I.

WITNESSES:
O. F. Blankmeister
Th. Martin

INVENTOR
Karl Schmidt
BY
Emil W. Reichelt
ATTORNEY.

No. 700,378. Patented May 20, 1902.
K. SCHMIDT.
PIPE COMPENSATOR.
(Application filed Feb. 12, 1901.)
(No Model.) 4 Sheets—Sheet 2.
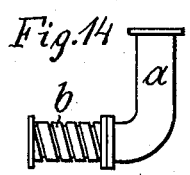
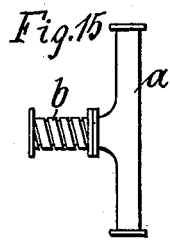
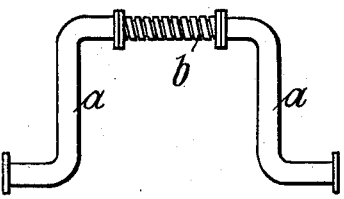
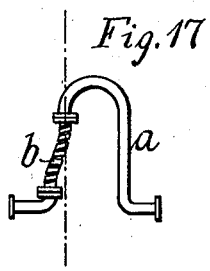
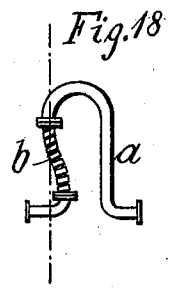
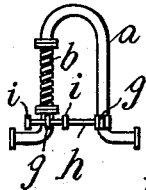
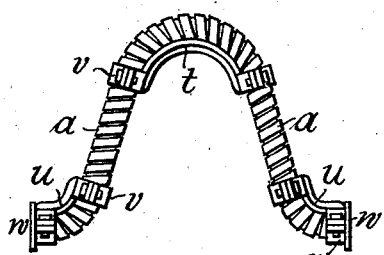
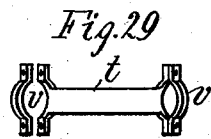
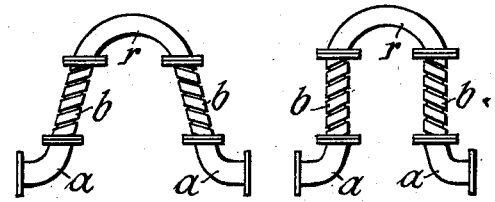
WITNESSES:
O. F. Blankmeister
Th. Martin
INVENTOR
Karl Schmidt
BY
ATTORNEY.

No. 700,378. Patented May 20, 1902.
K. SCHMIDT.
PIPE COMPENSATOR.
(Application filed Feb. 12, 1901.)
(No Model.) 4 Sheets—Sheet 3.
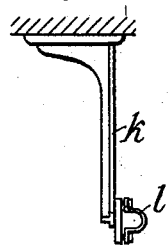
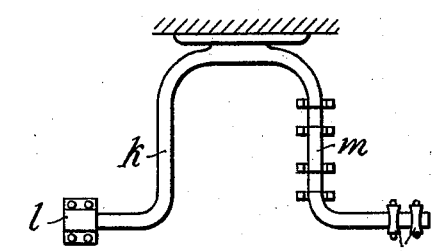
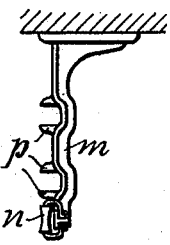
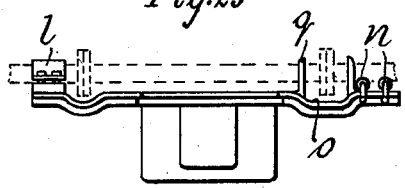
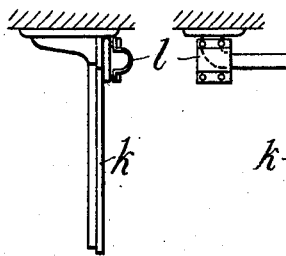
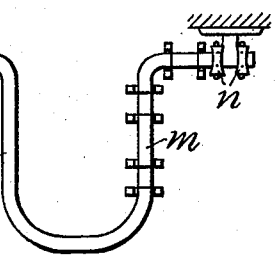
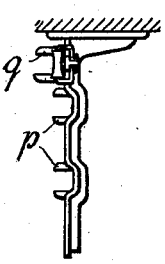
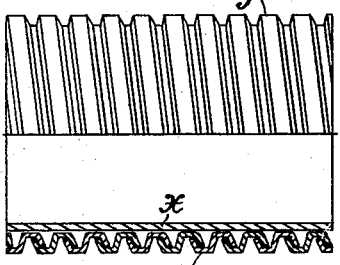
WITNESSES:
O. F. Blankmeister
Th. Martin
INVENTOR
Karl Schmidt
BY
Emil Reinhelt
ATTORNEY.

No. 700,378. Patented May 20, 1902.
K. SCHMIDT.
PIPE COMPENSATOR.
(Application filed Feb. 12, 1901.)
(No Model.) 4 Sheets—Sheet 4.
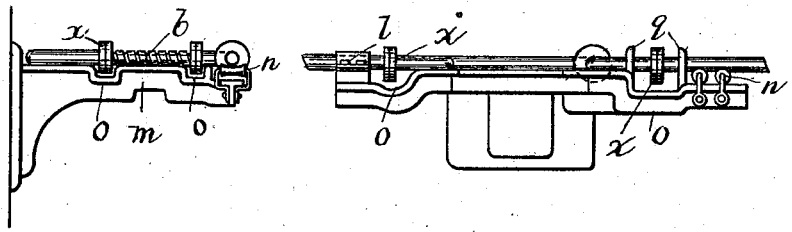
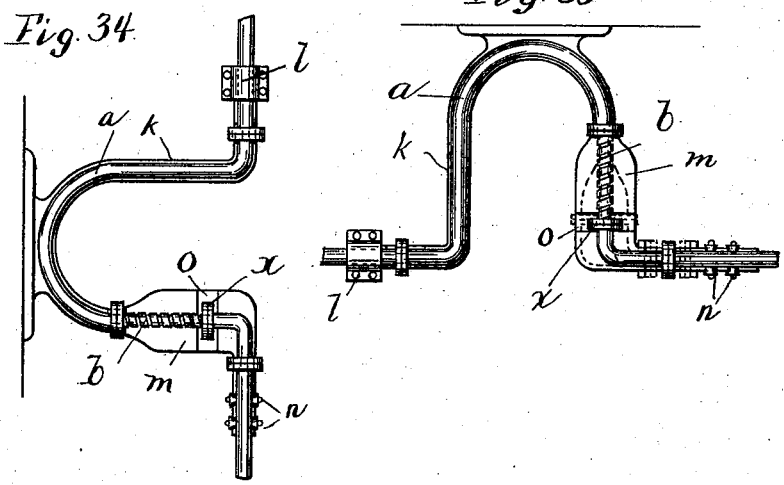
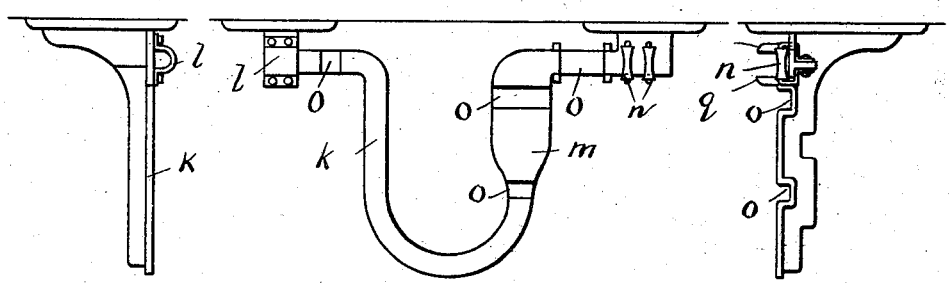
WITNESSES:
O. F. Blankmeister
Th. Martin
INVENTOR
Karl Schmidt
BY
ATTORNEY.

UNITED STATES PATENT OFFICE.

KARL SCHMIDT, OF DRESDEN, GERMANY.

PIPE-COMPENSATOR.

SPECIFICATION forming part of Letters Patent No. 700,378, dated May 20, 1902.

Application filed February 12, 1901. Serial No. 47,072. (No model.)

*To all whom it may concern:*

Be it known that I, KARL SCHMIDT, a citizen of the Kingdom of Saxony, residing at Dresden, in the Kingdom of Saxony, German Empire, have invented certain new and useful Improvements in Pipe-Compensators; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention has relation to new and useful improvements in devices for compensating the motion of piping ensuing from changes of temperature. Many devices intended to accomplish this result have hitherto been employed, the most common of which are loop or U shaped smooth pipes of copper, steel, or the like, which either had to be inserted at short intervals or to possess a curve of large dimensions in order not to be strained beyond the limit of elasticity. Calculations as to the necessary dimensions of the compensators of this kind were as a rule not made, so that accidents by breakages were frequent; but even when every kind of care is taken in the construction of such smooth compensators a guarantee against breakage may hardly be given, as even curves subjected to only a low degree of strain become in the course of years brittle and defective, a circumstance which cannot even be avoided by annually annealing the curves, as is a rule in some establishments. In cases where there was not sufficient space for compensating curves stuffing-box compensators were used. All movable parts, however, require constant attention, and thus many breakages are to be imputed to the fact that stuffing-boxes of this kind once put down were never again inspected. Attempts have also been made to transform the longitudinal motion into a rotatory one; but these rotatory compensators too demand frequent inspection and become dangerous when such is omitted. Finally, trials have been made with compensators which instead of being made of smooth-pipe curves and angles were composed of corrugated pipe or metallic hose; but these, as might have been anticipated, are connected with the drawback that they are in consequence of their curvature already under a great, in many cases inadmissible, strain and are therefore when further strained not able to prevent a breakage, as may be easily shown by experiment.

The object of this invention is now to provide a means or device giving the piping the required freedom of motion and affording a perfect compensation of the same without possessing the drawbacks and dangers of the former compensators. This object is attained by avoiding the use of flexible curves or angles in the piping entirely and employing instead comparatively short straight connecting-pieces of very flexible metal tube or metallic hose of, for instance, the Lavavasseur-Witzenmann patent, Frank patent, or another kind and in such manner that these are arranged at an angle to the longitudinal extent of the expanding pipe either in the same plane with the latter or another. Connecting-pieces of this kind when used as described constitute a novel useful device, inasmuch as the flexible connecting-piece is normally straight or even bent in the opposite sense to that in which it is to act when compensating, so that it is subjected in the latter instance to the least possible strain and its full elasticity is made use of. Thus when compared to the flexible pipe inserted in a bent condition from the start this connecting-pipe is able to compensate a considerable expansion of the piping before it suffers the strain that the other normally is under, and even twice this much if it is inserted with a corresponding bend in the opposite sense, as that altogether its ability to compensate without danger of breakage is much greater than that of the compensator with the initial strain. The employment of these compensators with straight or approximately straight flexible metal pipes may be of various kinds and is especially advantageous in connection with form-pieces of L, T, or + shape, &c. For these pieces copper is generally prescribed as material in cases of pipes of large diameter; but as the existing form-pieces of this kind were not flexible in any considerable degree there was difficulty in putting down piping meeting from three different directions—for instance, in such a manner that the copper form-piece was subjected to an even strain from all sides. Then in the course of its service the strains put on it from the several pipe-lines are constantly changing. It has therefore to offer various resistances to torsion, bending, tension, and compression, so that breakages and ensuing accidents are even more frequent with these form-pieces than with longitudinal compensators. These drawbacks all disappear if to these inflexible comparatively or stiff form-pieces straight pieces of highly-flexible metal pipe are connected at one or more points, thus giving the form-pieces the nature of compensators. When form-pieces are employed in this manner, there is not only the advantage gained of having much less strain in them, but also a further practical advantage of economy, as the curved parts, &c., may now be made of iron instead of the more costly metal used for them at present.

I have fully and clearly illustrated my invention in the accompanying drawings, wherein—

Figure 12:
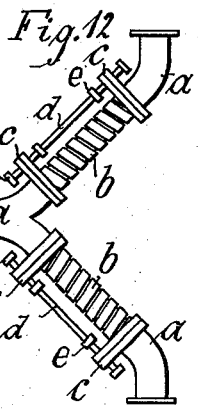

Figures 1 to 16, inclusive, show various forms of inflexible pipe-forms in connection with which my improved compensator is employed. Fig. 12 shows a pipe-form with my improved compensator attached thereto and also an improved means for limiting the compressive and tensile strain thereon. Fig. 17 shows the position assumed by the compensator when the pipes are subjected to compressive strain. Fig. 18 shows the position assumed by the compensator when the pipes are subjected to tensile strain. Fig. 19 is a view of a pipe-form having my improved compensator attached thereto and improved means to prevent excessive bending of the compensator. Fig. 20 is a plan view of one form-support for the pipe-form and compensator. Fig. 21 is a side elevation of the support shown in Fig. 20, taken from the left. Fig. 22 is a side elevation of Fig. 20, taken from the right. Fig. 23 is a front elevation of another form of support. Figs. 24 to 26 show a modified form of support in plan and side elevation. Fig. 27 shows another arrangement of the compensator, and Fig. 28 shows the position assumed by the compensator shown in Fig. 27 when subjected to strain. Figs. 29 and 30 show, respectively, a stiffening-brace and a compensator constructed of a continuous flexible pipe, in connection with which the brace is to be employed. Fig. 31 is a view, partly in section, of the improved flexible piping employed in the construction of my compensator. Fig. 32 is a front elevation of a support similar to that shown in Fig. 22 and the manner in which the compensator is placed thereon. Fig. 33 is a side elevation of the support and compensator. Figs. 34 and 35 are top plan views of the support thereon; and Figs. 36, 37, and 38 are views of a modified form of the support with the compensator removed.

Figure 9:
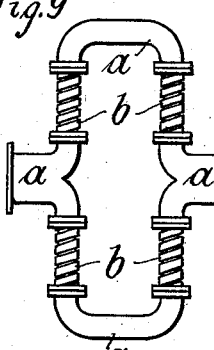
Figure 10:
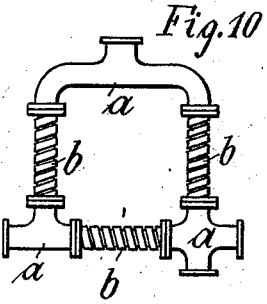
Figure 11:
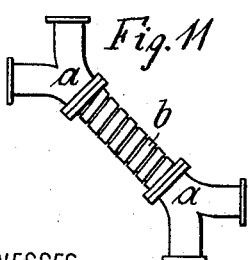
Figure 13:
Figure 13:
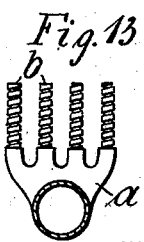

The compensators, as shown in the drawings, are preferably connected with their inflexible parts $a$ to the several pipe-lines in such a manner that the flexible piece $b$ is disposed at an angle to the pipe-line—as, for instance, in Figs. 1 to 4, 9, 11, 12, 13—as in such position it is best adapted to be bent to and fro, Figs. 17, 18. In many cases, however, the flexible piece might to the same advantage be disposed parallel to or in the axis of the respective line of piping. The latter arrangement might especially be employed in cases of lines of piping meeting at an angle—as, for instance, in Figs. 5 to 8, 10, 14, 15. In connection with pipes of large diameter a plurality of thinner compensating pipes might be used instead of a single one of the same diameter to make up the sectional area required, as Figs. 9, 13 show.

To prevent the flexible members $b$ from ever being overstrained, suitable safety devices are to be attached to the stiff parts $a$. For this purpose eyes $c$ may be provided on the parts $a$, through which a rod $d$ passes loosely with lateral play, carrying both between the eyes as well as behind them abutting shoulders $e\,f$, Fig. 12, of which the shoulders $f$ prevent the arising of excessive tensile strains and the shoulders $e$ of excessive compressive strains by limiting the respective motions of the eyes $c$, and thereby of the members $a$, without being able to prevent the swinging motion of the flexible pieces. In similar manner a device may be employed in connection with the form-pieces for preventing too great bending strains in the parts $b$ and in the case of several compensators being used for dividing the work of compensating equally among all and at the same time for making gross faults in the putting down of the piping evident. For this purpose lugs $g$ may be provided on the parts $a$, through which a rod $h$ loosely passes, having shoulders $i$ before and behind the lugs and limiting the swinging motion of the flexible parts by its shoulders striking against the lugs $g$, Fig. 19.

Figure 2:
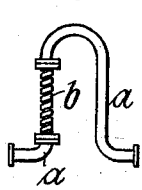
Figure 3:
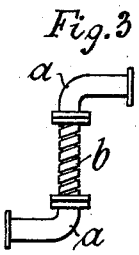
Figure 4:
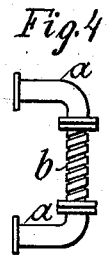
Figure 5:
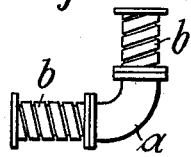
Figure 6:
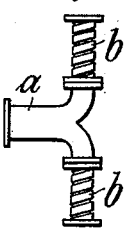
Figure 7:
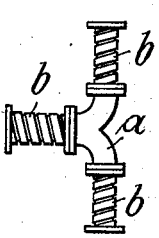
Figure 8:
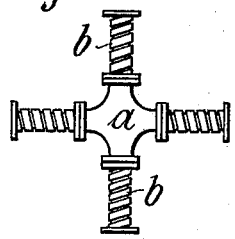

In order to obviate the sagging of the flexible connections of the compensator, I have provided an improved support upon which the compensator is mounted and secured in operative position. This support is also so constructed as to provide means for preventing too great tensile and compressive strains upon the flexible pipes both laterally and perpendicularly to the direction of motion, so that any other devices for this purpose may be dispensed with. In the drawings I have shown this support as consisting of a bracket so formed and constructed as to conform to the general contour of the compensator which is to be supported. I have illustrated the bracket as destined or intended for use in connection with a U-shaped compensator and formed with arms $k\,n$. Upon the arm $k$ is a strap $l$ or other suitable means for securely holding or binding the piping $a$ or the compensator to the said arm in order that the motion during tensile or compressive strain can only take place in one direction. Upon the arm in the direction of which the compensating motion is intended to take place (I have shown it as the arm $m$) are mounted in any suitable manner a series of friction-rollers $n$, upon which the piping rests and which serve to reduce the friction between the moving portion of the piping and the support, and thus facilitate the movement of the piping. When a compensator, as shown in Fig. 2, is employed, a pair of supports are generally used and are so arranged that the pipe-line, which is rigidly connected to the arm $k$ of one support will be allowed to rest upon the friction-rollers $n$ on the arm $m$ of the other support. Within the arms of the support are formed indentations or recesses $o$, of sufficient depth and width to form spaces for the flanges $x$, formed at the union of the compensator with the form-pieces or the pipe-line. These recesses are provided with lugs $p\ q$, as shown in Figs. 23, 25, and 26, which project above the pipe on either side of the flanges, and thus form an efficient means for limiting the movement of the pipes caused by the tensile or compressive strain to which they are subjected. Along the arm on which the compensator rests may also be placed a series of lugs $p$, which extend above the pipe and provide means for limiting the lateral bending of the compensator.

It will be seen from the above description that when the pipes have an excessive movement their flanges will abut against the edges of the recesses $o$ and the lugs $q$, and thus be limited or restrained in their movement, and in the same manner the compensator strikes the lugs $p$ and is restrained when subjected to an excessive lateral bend.

To insure the arising of only low strains from bending and to fully utilize the flexibility for compensating purposes, the connecting-piece $a$ should whenever possible be so placed that the flexible member $b$ is normally drawn just as far to the one side as it will in any case be drawn to the other in compensating. (See Fig. 18.) Instead of this, though, the stiff pieces $a$ may be so disposed in regard to the flexible ones $b$ that the latter are normally, as in Fig. 27, inclined toward each other and become more parallel as the piping expands, Fig. 28. For this purpose the curve $r$ should be entirely free to move, but the knees $a\ a$, Fig. 27, and the adjoining pipe-line guided so that the curve is able to rise as the knees approach each other. As it is desirable to avoid flanges as much as possible, the stiff members may consist of flexible pipe or hose, too, armed, however, with stiffening devices or braces $t\ u$, embracing the flexible pipe at the ends of the curves with straps $v$, Fig. 29, and preventing further bending of the parts between, Fig. 30. Forces acting on the ends $w$ would then produce a bending of the unarmed parts $a$, Fig. 30, only. The straps $v$, modifying the motion of the various parts of the pipe, might, instead of being at the ends of curved bars or braces, also be arranged on supports on which the pipe rests or which are disposed at the side of the pipe. Besides as compensators such flexible pipes, of which certain parts are stiffened, may be used in many other ways where metallic hose or flexible pipes are employed.

To prevent in the case of steam-piping condensed water from gathering in the depressions of the corrugated pipes and to reduce the loss by friction between the steam or fluid conducted and the sides of the corrugated pipes, the latter, $y$, having the sufficient thickness for the strength required of them, may be lined with thinner smooth and flexible pipes $x$, Fig. 31.

What I claim, and desire to secure by Letters Patent of the United States, is—

1. In a pipe-compensator, the combination of stiff pipes and flexible pipe members so disposed to one another that the axis of the pipe whose longitudinal movement is to be compensated does not coincide with that of the one to be subjected to bending and means for limiting the bending of the flexible pipes.

2. The combination of stiff pipes with straight, or approximately straight, flexible pipe members and stiff form-pieces, connecting the said flexible pipe members.

3. In combination with a pipe-compensator, rods disposed transversely to the flexible pipes, with abutting shoulders for preventing excessive bending strains in the flexible pipes.

4. In combination with a compensator, a support with lugs or the like, between which the connecting-flanges or special lugs on the pipes are positioned, to prevent bending in a plane perpendicular to the direction of motion, and excessive tensile and compressive strains in the flexible pipes.

5. In combination with a compensator, a support with indentations for receiving the connecting flanges or lugs on the pipes, for preventing bending of the flexible pipes in a plane perpendicular to the direction of motion and excessive tensile and compressive strains in the flexible pipes.

6. In combination with a compensator, a support with lugs or the like, arranged in the direction of the axis of the piping, between which lugs the connecting flanges or lugs on the pipes come to rest, to prevent excessive bending of the flexible pipe.

7. In combination with a compensator, a support with indentations arranged in the direction of the axis of the piping, in which the flanges or lugs on the pipes come to lie, to prevent excessive bending of the flexible pipe.

8. In combination with a compensator, a support with lugs or the like, arranged in the direction both of the axis of the flexible pipe, and of the axis of the expanding piping, between which the connecting flanges or lugs on the pipes are laid, to prevent sagging, and excessive tensile and compressive strains and excessive bending of the flexible pipe.

9. In combination with a compensator, a support with indentations arranged in the direction of both the axis of the pipe to suffer bending as well as the axis of the pipe expanding, into which the connecting flanges or lugs on the pipes are put, to prevent sagging, and excessive tensile and compressive strains and excessive bending of the flexible pipe.

10. The combination with a flexible compensator, of a support provided with rollers to facilitate the movement of the piping and means to restrain an excessive movement of the piping.

11. In combination with a flexible compensator, a support provided with a fastening device for fixing one point of the piping, so that its motion may take place toward one side only and rollers to facilitate the said motion.

In testimony whereof I affix my signature in presence of two witnesses.

KARL SCHMIDT.

Witnesses:
EMIL REINHOLT,
HERNANDO DE SOTO.